Figure 2:
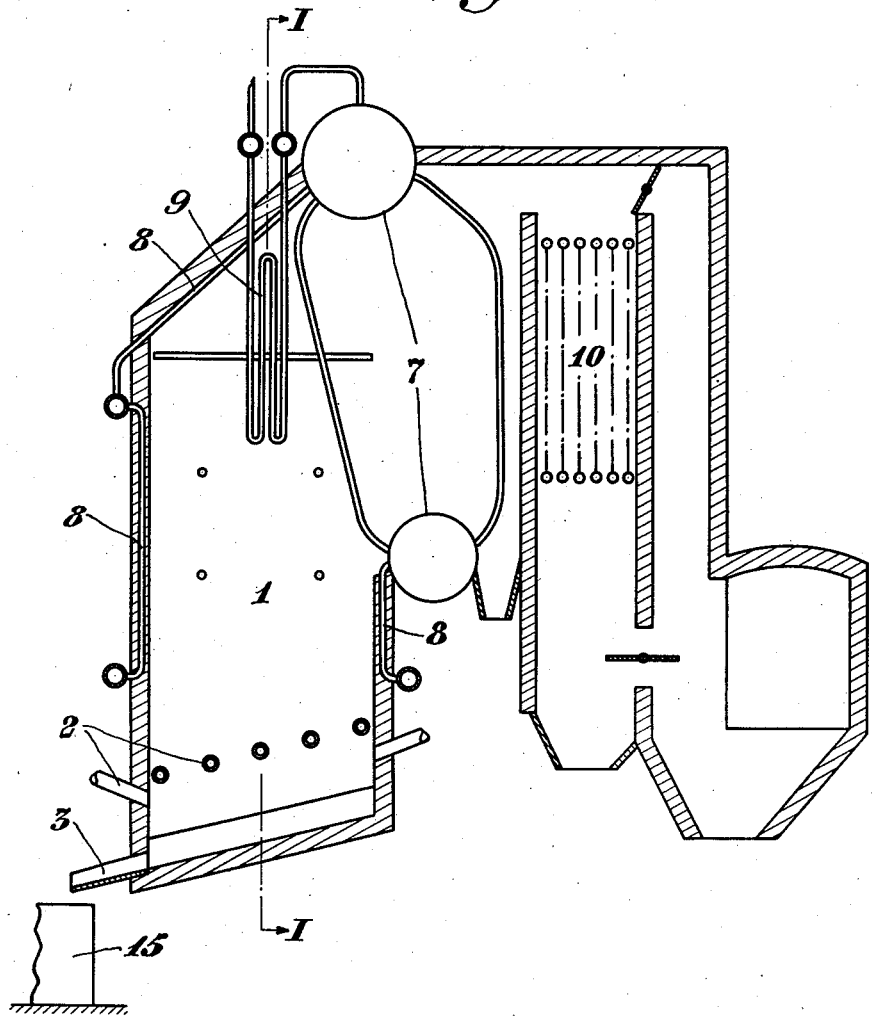

Nov. 28, 1939.  E. J. JANHUNEN  2,181,330
METHOD OF AND APPARATUS FOR RECOVERING CHEMICALS
FROM CELLULOSE WASTE LIQUOR
Filed April 10, 1937  2 Sheets-Sheet 1
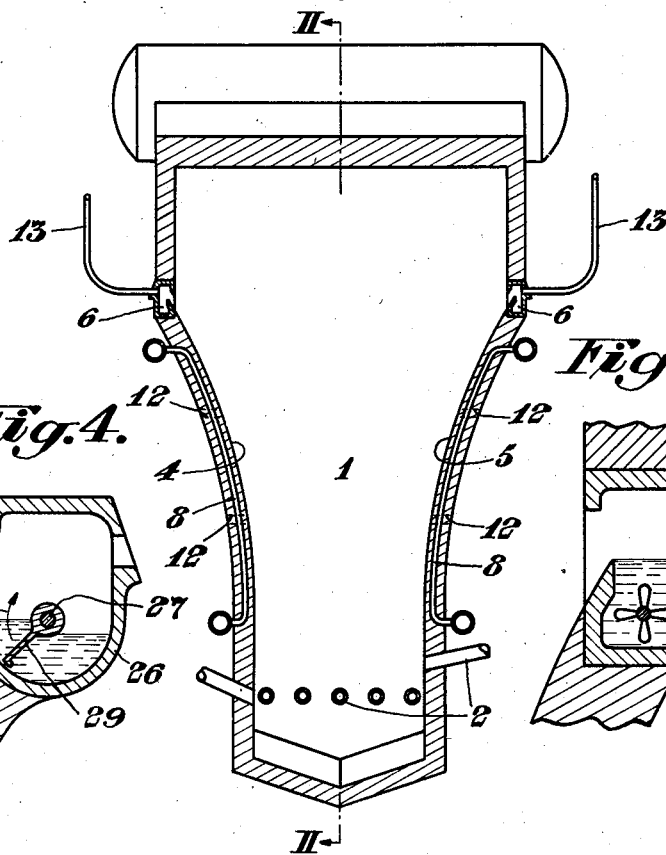
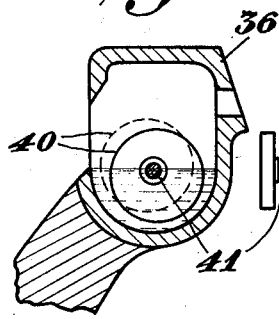
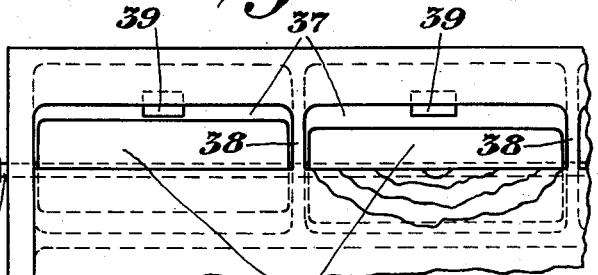
Inventor:
Erkki Johannes Janhunen
by George Bayard Jones
Attorney.

Patented Nov. 28, 1939

2,181,330

UNITED STATES PATENT OFFICE 2,181,330

METHOD OF AND APPARATUS FOR RECOVERING CHEMICALS FROM CELLULOSE WASTE LIQUOR

Erkki Johannes Janhunen, Karihaara, Kemi, Finland

Application April 10, 1937, Serial No. 136,169
In Finland April 17, 1936

10 Claims. (Cl. 23—48)

The present invention relates to a method of and an apparatus for recovering chemicals from cellulose waste liquor by evaporating the liquor to dryness and then burning the same. Heretofore, rotary furnaces have usually been employed for evaporating the liquor, from which furnaces the evaporated dry mass has been transferred to melting furnaces in which it has been burnt. During recent times it has been proposed to carry out both the evaporation and the burning in one and the same furnace in which the liquor is sprayed and atomized and is meanwhile subjected to an ascending flow of hot gases of combustion, so that the water contained in the liquor evaporates, and the dried matter of the liquor sinks to the bottom of the furnace, where the organic substances contained in the dried matter are combusted and form the abovementioned hot gases. It has also been proposed to spray the liquor across the upper portion of the furnace chamber and in this manner to evaporate the spray particles sufficiently to make them adhere to the opposite wall of the furnace chamber on which said particles are then evaporated to dryness by the ascending gases of combustion, and from which they finally break away in the form of lumps which drop to the bottom of the furnace chamber which constitutes a burning and reduction zone in which said lumps are combusted. Spraying the liquor in this manner entails the difficulty, however, that a portion of the sprayed liquor is directly evaporated to dryness in the ascending hot gases of combustion and is carried along by the latter out of the furnace chamber, whereby a considerable loss of chemicals may be caused.

The present invention aims to overcome this difficulty and to effect recovery of the chemicals contained in the liquor with the least possible losses and by means of a simple apparatus which is reliable in operation.

The method according to the invention consists principally in causing the liquor to flow down over a surface along which hot gases are conducted countercurrentwise to the downward flow of liquor over the surface. The liquor is thus introduced, without spraying and atomization, into the evaporation and burning furnace in the state of a flowing current of liquid. In this way all danger is removed of the liquor being carried along by the hot gases of combustion, because the surface of the drying liquor will form a protecting film, as it were, which practically protects against the liquor inside said film being brought along by the gases, and thus also against loss of chemicals.

The accompanying drawings illustrate somewhat schematically an apparatus for carrying out the method according to the present invention. Fig. 1 shows a vertical section of the furnace chamber on the line I—I in Fig. 2, and Fig. 2 shows a vertical section on the line II—II in Fig. 1. Fig. 3 shows to a larger scale a section of a slightly modified constructional form of a liquor distributing box. Fig. 4 shows, likewise to a larger scale, a section of a third constructional form of a liquid distributing box, and Fig. 5 shows in similar manner a fourth constructional form of such a box, a portion of which is shown in side view in Fig. 6.

The apparatus schematically illustrated in the drawings by way of example comprises a furnace chamber 1 the lower portion of which constitutes a burning and reduction zone for the evaporated dry mass obtained from the liquor. Apertures 2 are provided in the walls of said lower portion for introducing air for the combustion, and at the bottom of the chamber there is provided a spout 3 for the discharge of the melted chemicals. In the instance illustrated two opposed walls 4 and 5 of the furnace chamber are formed to a curved shape, and at the upper ends of these curved portions there are provided liquor distributing boxes 6 in the furnace walls. The upper region of the furnace chamber is in direct communication with a steam boiler 7, which will thus be subjected to the heat of the gases of combustion leaving the furnace chamber. Connected to the steam boiler are tubes 8 located in the walls of the furnace chamber, and a superheater 9 provided in the upper portion of the furnace chamber. Having passed the steam boiler the gases flow through an economizer 10 and then to a smokestack, not shown in the drawings.

Before starting operation suitable fuel is introduced into the lower portion of the furnace chamber 1 and is combusted by the aid of air introduced through the apertures 2, so as to generate the required initial heat. When it is observed through the inspection holes 12 provided in the walls 4 and 5 of the chamber that the latter has become sufficiently hot, the introduction of the liquor is commenced.

The liquor is previously evaporated, by the aid of the usual well-known apparatus employed for the purpose, to a degree of concentration suitable to drying and burning it in the furnace chamber, that is, a consistency holding approximately 45 to 60 per cent dry matter. The liquor is supplied through pipes 13 to suitable liquor distributing devices, such for example as the containers or boxes 6, shown in Fig. 1, which extend over practically the entire width of the walls 4 and 5. The liquor supplied to the boxes rises over the inner edges of the same and flows out onto the curved inner surfaces of the walls 4 and 5. The boxes are provided with suitable inspection holes 14, Fig. 3, to make it possible to observe the flow of the liquor from the boxes onto the said surfaces.

As illustrated also in Fig. 1, the inner surfaces of the walls 4 and 5 are curved in such manner that the slope of the same becomes gradually steeper from the upper edge of the surface, that is to say from the liquor distributing box 6, towards the bottom. The curvature of the surface is so chosen that the liquor running over the edge of the distributing box 6 flows at first at a low speed only over the surface. The liquor, being subjected to the heat of the hot gases ascending from the lower portion of the furnace chamber, gives off some of its water in the state of steam to said gases, and is thus concentrated. Therefore, the liquor will, of course, gradually become more viscous during this downward movement, but the inclination of the surface over which the liquor flows also becomes gradually steeper, so that the liquor will continue its slow downward movement.

In this way the liquor flows down over the surface and is continuously concentrated, until so much water has been evaporated that the liquor adheres to the wall. It will be understood that the layer of liquor adhering to the surface of the wall becomes continuously thicker and swells, as black liquor always does when it is evaporated to dryness. When the layer of dried liquor has become sufficiently thick, it breaks away from the wall in the form of lumps which drop to the bottom of the furnace chamber. In the place of these lumps, fresh lumps are formed, and in this way the drying of the liquor continues.

The lumps of dried liquor are burnt in the lower portion of the chamber with the aid of air introduced through the apertures 2. The heat thus formed is sufficient to effect evaporation of the water from the liquor flowing along the walls 4 and 5, provided that the liquor has been brought to a suitable concentration before it is delivered to the distribution boxes 6. Therefore, no extra fuel need be introduced into the furnace chamber during the continued operation.

The gases of combustion leaving the furnace chamber first sweep across the superheater 9 and then through the boiler 7 to both of which heat is given off. Heat possibly remaining in the gases is utilized in the economizer 10. The gases may also be allowed to pass through well-known devices, such as a so-called scrubber or a rotary disk evaporator, for recovering such dust-like chemicals as may have been carried along by the gases from the melting zone or from the evaporation surfaces.

The melted mass of chemicals formed by the combustion of the lumps of dried liquor in the lower portion of the furnace chamber is emptied, continuously or periodically, through the discharge spout 3 into a dissolving tank 15 in which said mass is dissolved in water in the usual manner.

Sodium sulphate, which must be continuously supplied in order to maintain the quantity of chemicals required for carrying out the sulphate pulping process, may be mixed with the black liquor either before the liquor is supplied to the distributing boxes, or in said boxes. In the latter case the distributing box may be provided with a rotary mixer 16, as illustrated in Fig. 3.

Instead of allowing the liquid to flow continuously from the distributing box 6 on to the evaporating surface in the furnace chamber, the liquor may be fed from the box periodically or at intervals. In this manner the result is obtained that the liquor flowing down along the evaporating surface gets time to dry to some extent before the surface is again washed over by the liquor. Such intermittent feeding of the liquor may be effected in various ways. For instance, an intermittently working pump may be used for feeding the liquor to the distributing box. Discharge of the liquor from the distributing box may also be effected by means of vanes or scoops attached to a rotary shaft in the box, or by periodic depression of displacement bodies into the liquor in the box.

Fig. 4 illustrates a liquor distributing box 26 in which a shaft 27 is rotatably journalled, said shaft being rotated in the direction indicated by the arrow 28 by any suitable means not illustrated in the drawings. Secured to the shaft 27 is a vane or scoop 29 which extends along the entire length of the box, and which reaches close to the semi-cylindrical bottom of the box. For each rotation of the shaft said vane 29 will thus dive down into the liquor in the box and raise the liquor over the flow-off edge of the box.

In the construction illustrated in Figs. 5 and 6 the box 36 is divided into sections 37 separated by partitions 38 and provided with liquor admission ports 39. Provided in each of said sections is a displacement body 40 attached to a common shaft 41 rotatably journalled in the box and driven by any suitable means not illustrated in the drawings. The displacement bodies 40, which may be shaped as cylinders, are attached eccentrically to the shaft 41 and are spaced angularly relatively to one another. Upon rotation of the shaft 41 the displacement bodies 40 will thus alternately dive down into the liquor in the associate sections and force the liquid out over the flow-off edge of the section, so that the liquor flows alternately from different sections along the evaporating surface.

The evaporating surfaces may be made of fire bricks, and the water tubes 8 may be built into the walls. The water tubes may also form the inner surface of the walls and may be covered by a heat-conducting material, such as cast iron plates or the like.

I claim:

1. The method of recovering chemicals from cellulose waste liquor, which consists in causing the liquor to flow in a relatively thin film down over a stationary, inwardly inclined surface gradually increasing in inclination from its upper portion downwardly whereby the liquor is gradually given a steeper direction of flow in the course of its movement over said surface, burning the resultant dried matter of the liquor, and conducting hot gases from such combustion along said surface countercurrentwise to the flow of liquor over the same to evaporate the liquor to dryness in preparation for burning with a minimum of evaporating surface.

2. The method of recovering chemicals from cellulose waste liquor defined in claim 1, further consisting in concentrating the liquor before admitting the same to the stationary surface to a degree sufficient to ensure that the gases formed by combustion of the dried matter, after sweeping over the surface and effecting evaporation of the liquor thereon, still hold sufficient heat to effectively heat a steam boiler.

3. An apparatus for recovering chemicals from cellulose waste liquor by evaporating the liquor and then burning it, comprising in combination a stationary surface having a gradually increasing inclination from its upper edge downwards, a liquor distributing box along the upper edge of said surface, and means for conducting hot gases along said surface from below upwards.

4. An apparatus for recovering chemicals from cellulose waste liquor by evaporating the liquor and then burning it, comprising in combination a stationary surface at least the upper portion of which is curved with a gradually increasing inclination to the horizontal plane in the downward direction from the upper edge of the surface, a liquor distributing box along the upper edge of said surface, and means for conducting hot gases along said surface from below upwards.

5. An apparatus for recovering chemicals from cellulose waste liquor by evaporating the liquor and then burning it, as defined in claim 3, having means associated with the liquor distributing box for intermittent discharge of liquor from the box to the surface.

6. An apparatus for recovering chemicals from cellulose waste liquor by evaporating the liquor and then burning it, as defined in claim 3, having means associated with the liquor distributing box for alternate distribution and discharge of the liquor at different points along the upper edge of the surface.

7. An apparatus for recovering chemicals from cellulose waste liquor by evaporating the liquor and then burning it, as defined in claim 3, having stirring means associated with the liquor distributing box.

8. An apparatus for recovering chemicals from cellulose waste liquor by evaporating the liquor and then burning it, comprising a substantially vertical chamber, and a liquor distributing box located in a wall of said chamber, said wall having a curved inner surface with a gradually increasing inclination to the horizontal plane in the direction from said box towards the lower portion of said chamber where said inner surface is substantially vertical, the curvature of said surface being directed inwardly, the lower portion of said chamber forming a burning and reduction zone for the evaporated liquor flowing from said box over said inner surface of said wall, and said chamber being shaped in such manner that gases of combustion from said burning and reduction zone are caused to flow along said surface of said wall to evaporate the liquor thereon.

9. A furnace apparatus for recovering chemicals from cellulose waste liquor, comprising in combination, a stationary wall having an inner surface inwardly inclined and gradually increasing in inclination to the horizontal from above downwardly, means for distributing liquor along the upper part of said surface, means at the lower portion of the furnace whereby the material resulting from drying of said liquor is burned, and means for conducting hot gases from such combustion upwardly along said surface.

10. A furnace apparatus for recovering chemicals from cellulose waste liquor comprising, in combination, a stationary wall having an inner surface at least the upper portion of which is curved with a gradually increasing inward inclination to a horizontal plane in the downward direction from the upper portion thereof, means for distributing liquor along the upper part of said surface, means at the lower portion of the furnace whereby the material resulting from the drying of said liquor is burned, and means for conducting hot gases from such combustion upwardly along said surface.

ERKKI JOHANNES JANHUNEN.